United States Patent
Pietrzak et al.

(10) Patent No.: US 11,687,434 B2
(45) Date of Patent: Jun. 27, 2023

(54) SCANNING A COMPUTING SYSTEM TO DETERMINE COMPUTING PROFILE AND PROBLEMS TO RECOMMEND AN ACTION TO INITIATE WITH THE COMPUTING SYSTEM

(71) Applicant: INTERNATIONAL BUSINESS MACHINES CORPORATION, Armonk, NY (US)

(72) Inventors: Andrzej Pietrzak, Cracow (PL); David Warren Knapp, Jr., Modlniczka (PL); Michal Paluch, Cracow (PL); Tomasz Hanusiak, Cracow (PL); Piotr P. Godowski, Cracow (PL); Szymon Kowalczyk, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/452,554

(22) Filed: Oct. 27, 2021

(65) Prior Publication Data
US 2023/0129856 A1   Apr. 27, 2023

(51) Int. Cl.
*G06F 11/00*   (2006.01)
*G06F 11/32*   (2006.01)
(Continued)

(52) U.S. Cl.
CPC ........ *G06F 11/328* (2013.01); *G06F 11/0772* (2013.01); *G06F 11/3006* (2013.01); *G06F 11/3068* (2013.01); *G06F 11/327* (2013.01)

(58) Field of Classification Search
CPC .............. G06F 11/328; G06F 11/0772; G06F 11/3006; G06F 11/3068; G06F 11/327
See application file for complete search history.

(56) References Cited

U.S. PATENT DOCUMENTS 9,602,472 B2   3/2017 Nandi et al.
10,599,538 B2 *   3/2020 Vichare ................. G06F 9/5038
(Continued)

FOREIGN PATENT DOCUMENTS

EP   2486536 A2   8/2012

OTHER PUBLICATIONS

D.W.Chadwick, et al., "A privacy preserving authorisation system for the cloud", Elsevier, Journal of Computer and System Sciences 78 (2012), pp. 1359-1373.

(Continued)

*Primary Examiner* — Charles Ehne
(74) *Attorney, Agent, or Firm* — Konrad Raynes Davda & Victor LLP; David W. Victor

(57) ABSTRACT

Provided are a computer program product, system, and method for scanning a computing system to determine a computing system profile and problems to recommend actions to initiate with the computing system. A package is transmitted to the computing system including package code to scan the computing system to determine a computing system profile comprising a computing architecture and installed applications at the computing system. The computing system profile is processed to determine a recommended action to perform with respect to the computing system to improve operations of the computing system based on the computing system profile. A display element is generated in a user interface with information on the recommended action to enable a user of the computing system to implement the recommended action. The package code executes within the computing system without communicating over the network to an external system outside of a computing environment of the computing system.

20 Claims, 4 Drawing Sheets

(51) Int. Cl.
    *G06F 11/07*        (2006.01)
    *G06F 11/30*        (2006.01)

(56) References Cited

U.S. PATENT DOCUMENTS

| 2008/0133681 A1* | 6/2008 | Jackson | G06F 11/2294 |
| | | | 709/204 |
| 2012/0216284 A1* | 8/2012 | Dhamankar | G06F 21/568 |
| | | | 726/24 |
| 2022/0067106 A1* | 3/2022 | Saez | G06F 9/5072 |

OTHER PUBLICATIONS

G, Shrivastava, et al., "Android application behavioural analysis for data leakage", Wiley Expert Systems, Jul. 2019, pp. 12.
T. Chen, et al., "Content Recommendation System Based On Private Dynamic User Profile", IEEE, Proceedings of the Sixth International Conference on Machine Learning and Cybernetics, Hong Kong, Aug. 2007, pp. 19-22.

* cited by examiner

SCANNING A COMPUTING SYSTEM TO DETERMINE COMPUTING PROFILE AND PROBLEMS TO RECOMMEND AN ACTION TO INITIATE WITH THE COMPUTING SYSTEM

BACKGROUND OF THE INVENTION

1. Field of the Invention

The present invention relates to a computer program product, system, and method for scanning a computing system to determine a computing system profile and problems to recommend actions to initiate with the computing system.

2. Description of the Related Art

Administrators of computing systems as well as users of personal computers may be concerned with running diagnostic tools on their system to troubleshoot problems and recommend applications to address problems because many diagnostic tools communicate system information with a third party server over the Internet. Computer operators may be concerned that sensitive personal and business data and proprietary computer architecture information may be transmitted outside of the control of the computer operator, and stored outside of their control. Due to these concerns, computer operators may be hesitant or decline to use diagnostic tools that recommend application solutions to detected problems by interacting with a remote third-party server to determine the recommendations.

There is a need in the art for improved techniques for performing diagnosis of computer systems and recommending actions, such as applications to install.

SUMMARY

Provided are a computer program product, system, and method for scanning a computing system to determine a computing system profile and problems to recommend actions to initiate with the computing system. A package is transmitted to the computing system including package code to execute in the computing system to perform operations including scanning the computing system to determine a computing system profile comprising a computing architecture and installed applications at the computing system. The computing system profile is processed to determine a recommended action to perform with respect to the computing system to improve operations of the computing system based on the computing system profile. A display element is generated in a user interface with information on the recommended action to enable a user of the computing system to implement the recommended action. The package code executes within the computing system without communicating over the network to an external system outside of a computing environment of the computing system when performing the scanning, the processing the computing system profile to determine the recommended action, and the generating the display element with information on the recommended action.

DETAILED DESCRIPTION

Operators of a computing system, including personal computing systems and enterprise systems, may be hesitant to run third party diagnostic software because they are concerned that sensitive information and proprietary information on their system architecture may be exposed over public networks or kept in unsecure cloud based storage outside the control of the computer operator.

Described embodiments provide improvements to computer technology for performing diagnostic operations of a computing system and recommendations of actions to improve operations of the computing system in a manner that addresses the security risks of diagnostic programs that communicate with a third party server over the Internet. The recommended actions based on the diagnostic operations may include recommended applications to install, recommendation to join database instances, correct errors/bottlenecks in the computing system, license renewals that are needed for installed applications, contact a consultant to assist in troubleshooting the computing system, etc. With described embodiments, a profiler package of code and product information is distributed to the computing system. The profiler code may operate entirely within the computing system to determine a computing system profile, such as hardware and software architecture, installed applications, file storage and access patterns, performance metrics etc., as well as problem classifications of possible problem configurations and deployments in the system, which can be determined from the storage and access patterns, performance metrics, and configuration. Using this gathered computing system profile and problem classifications, the profiler code may then process a database, such as an action database, included in the profiler package, to determine actions to perform with respect to the computing system, such as determine applications to recommend for installation on the computing system, to optimize performance and to determine product information on application programs suitable for the computing system to represent to the operator of the computing system.

With the described embodiments, the profiler package code solves the technical problem of allowing sensitive and proprietary information from leaving the computing system by operating entirely in the confines of the computing system environment without transferring any computing system information to third party servers over a public network. This allows for diagnosis and action recommendations in a secure manner to avoid compromising any of the sensitive and proprietary information maintained in the computing system.

Figure 1:
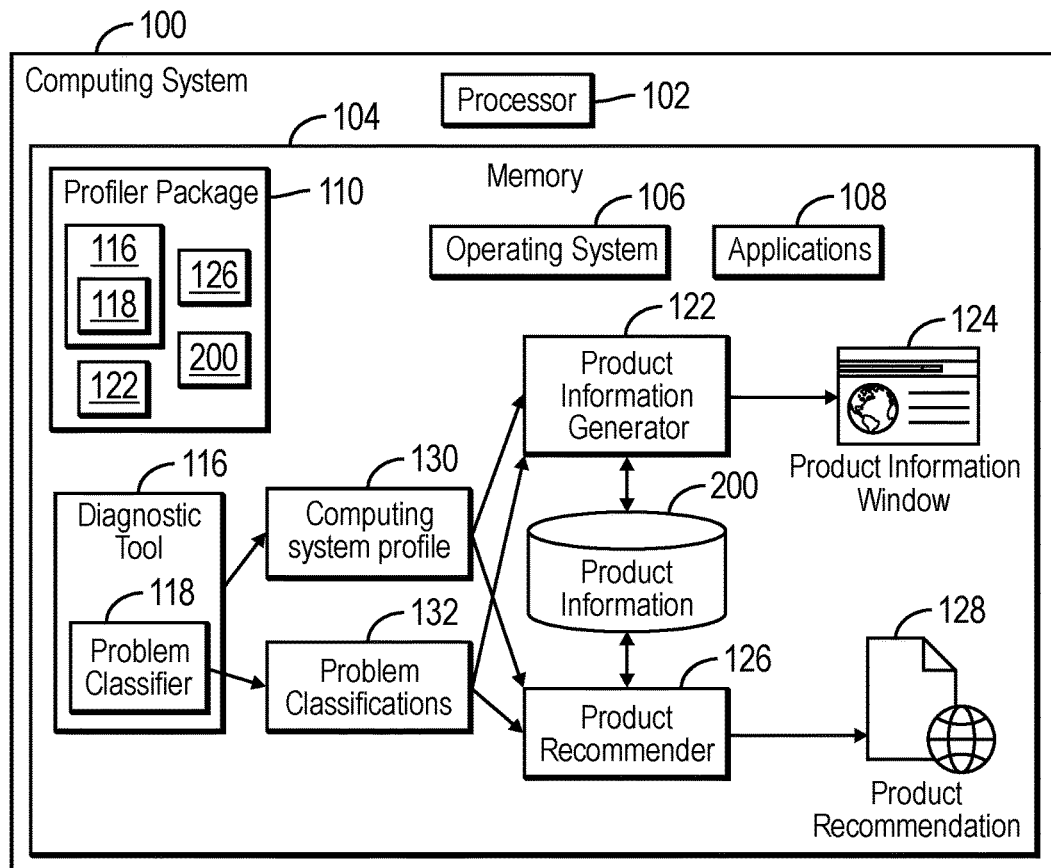
FIG. 1 illustrates an embodiment of a computing system.

FIG. 1 illustrates an embodiment of a computing system 100 having a processor 102 comprising one or more processor cores that execute programs loaded in a memory 104, including an operating system 106 and installed applications 108. The computing system 100 may download a profiler package 110 from a profiler provider 112 from over a network 114. The downloaded profiler package 110 includes a diagnostic tool 116, having a problem classifier 118, a product information database 200 having information on products, a product information generator 122 to generate information, such as in a computer window 124, from the product information database 200 to present to a user of the computing system 100, and a product recommender 126 to recommend applications in a display element 128 to install in the computing system 100. Installing the profiler package 110 in the computing system 100 installs the diagnostic tool 116, problem classifier 118, product information database 118, product information generator 122, and product recommender 126 in the memory 104.

The diagnostic tool 116 scans the computing system 100 to determine a computing system profile 130 comprising, as by way of example, installed applications, computing architecture (e.g., hardware, operating system, servers and connectivity for enterprise environments), file access patterns, file storage patterns, performance metrics (e.g., file access, network performance, database performance, backup performance, etc.) The problem classifier 118 processes the computing system profile 130 to determine problem classifications 132, which may comprise predefined codes for detected problems in the computing system 100. For instance, the problem classifier 118 may process file storage patterns to determine if duplicates of files are maintained, to determine if frequently accessed files are stored in faster access storage devices, to determine if less frequently accessed files are stored in slower archival storage, etc. The problem classifier 118 may also process performance metrics, such as network performance, file access performance, etc., to determine bottlenecks caused by hardware and/or software problems.

The computing system profile 130 and/or the determined problem classifications 132 may be inputted to a product information generator 128, which processes the product information database 200, to determine products to address the noted problem classifications 132 or related to installed programs. The product information generator 122 may then generate the product information window 124 in a computer display to display information on products that can be useful given the computing system profile 130, which may comprise advertisements for products, such as for software and hardware products.

The computing system profile 130 and the determined problem classifications 132 may be inputted to the product recommender 126, which processes the product information database 200, to determine products, such as software applications, that can correct the problem classifications 132, which may then be indicated in the product recommendation display element 128, such as an email including a link to access further information or download the recommended products.

In certain embodiments, the product information generator 122 is more focused on finding products related or that could be of use based on the computing system profile 130 to present advertisements for such products, whereas the product recommender 126 may be more focused on recommending products to address specific problems in the computing system 100, such as based on the problem classifications 132. In further embodiments, the product information generator 122 and product recommender 126 may be implemented in a single program. The product information window 124 and display element 128 may include hypertext links or code to enable the user of the computing system 100 to access further information and/or download the recommended products in the windows 124, 128 from an external software product server 134 over the network 114, such as the Internet. In this way, the user of the computing system 100 only leaves the confines of the computing system 100 environment when accessing information or acquiring a specific software product, and any internal system information used to determine the software products is not revealed to third parties.

In certain embodiments, the diagnostic tool 116, problem classifier 118, product information generator 122, action recommender 126 and product information 200 may all execute locally in the computing system 100 and will not access the network 114 to retrieve or send information. This method of the profiler package 110 operating only locally provides assurances to the operator of the computing system 100 that confidential, private, and sensitive personal and business information will never be transmitted over the Internet or leave the confines of the computing system 100. This allows the profiler package 110 to recommend useful actions, such as applications to install, fixes, licensing needs, and present advertisements and product information without transmitting any sensitive information in the computing system 100.

Further, the profiler provider 112 may continually update the components 116, 118, 200, 122, 126 of the profiler package 110 with new problem and configuration detection capabilities and information on newer products and updates. The operator of the computing system 100 may then download the most current version of the profiler package 110 to install and run.

In the embodiment of FIG. 1, the product recommender 126 recommends products to install. In alternative embodiments, the recommender 126 may not just recommend an application to install, but recommend one or more further actions, such recommend to join database instances, program fixes and configuration setting adjustments to correct errors/bottlenecks in the computing system, license renewals that are needed for installed applications, contact a consultant, etc. In such embodiments where the recommended action is other than installing an application, the information database 200 may include information on actions to take for different problem classifications 132 and computing system profiles 130.

In FIG. 1, the computing system 100 is shown as one computing system platform. In an alternative embodiment, the computing system 100 may comprise a distributed computing system connected through a network, such as an enterprise environment, with multiple servers, production servers, and computing systems implemented in a local or distributed network. In such distributed computing environments, the profiler package 110 components may be installed and run in a separate server, such as a web server, and only perform their operations with respect to computing devices in the distributed computing environment, and not access an external network to transmit any information outside of the distributed computing environment. In certain embodiments, the diagnostic tool 116 may access the network 114 to access machines within the distributed computing system, such as over a virtual private network (VPN) even when the network 114 comprises the Internet. However, in all cases, the diagnostic tool 116 operations are confined within the computing system 100 secure environment.

In certain embodiments, the diagnostic tool 116, problem classifier 118, product information generator 122, product recommender 126 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output product recommendations 128 and product information window 124 having specified confidence levels based on the input parameters. For instance, the input to the problem classifier 118 may comprise all the information gathered while scanning the computing system 100, such as hardware, operating system, computing devices, servers and connectivity, file access patterns, file storage patterns, performance metrics (e.g., file access, network performance, database performance, backup performance, etc.), and the problem classifier 118 may produce one or more problem classifications 132 with confidence levels. The product information generator 122 and product recommender 126 may be trained to produce their output for product information and product recommendations, respectively, based on the inputs 130 and 132. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the diagnostic tool 116, problem classifier 118, product information generator 122, product recommender 126, margin of errors are determined based on a difference of the calculated predictions and user rankings of the output. Biases at nodes in the hidden layer are adjusted accordingly to decrease the confidence levels for the output problem classifications 132, product information, and recommended products.

In an alternative embodiment, the components 116, 118, 122, 126 may be implemented not as a machine learning module, but implemented using a rules based system to determine the outputs from the inputs. The components 128, 132, and 148 may further be implemented using an unsupervised machine learning module, or machine learning implemented in methods other than neural networks, such as multivariable linear regression models.

The arrows shown in FIG. 1 between the components and objects in the memory 104 represent a data flow between the components.

The network 114 may comprise a network such as a Storage Area Network (SAN), Local Area Network (LAN), Intranet, the Internet, Wide Area Network (WAN), peer-to-peer network, wireless network, arbitrated loop network, etc.

The memory 104 may comprise a suitable volatile or non-volatile memory for storing programs to execute and information used by the programs to execute.

The programs 106, 108, 116, 118, 122, 126 may comprise program code loaded into memory and executed by a processor. Alternatively, some or all of the functions may be implemented in hardware devices, such as in Application Specific Integrated Circuits (ASICs) or executed by separate dedicated processors.

The functions described as performed by the program components 106, 108, 116, 118, 122, 126 may be implemented as program code in fewer program modules than shown or implemented as program code throughout a greater number of program modules than shown.

Figure 2:
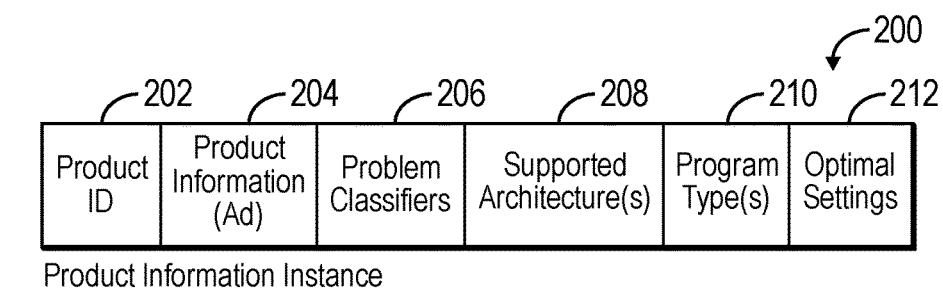
FIG. 2 illustrates an embodiment of an instance of product information in a product information database.

FIG. 2 illustrates an embodiment of an instance 200i of product information in the product information database 200, and includes: a product identifier (ID) 202; product information, such as descriptive information on the product, e.g., advertisements; problem classifiers 206 associated with the product 202, such as problems addressed by the product 202; supported architectures 208, e.g., hardware, operating system, etc.; program type(s) 210 indicating one or more types of software features included in the product 202; and optimal settings 212, such as optimal system and program configurations for different platforms on which the product 202 is installed.

In the embodiment of FIG. 2, the information database 200 provides recommendations of programs to install. In alternative embodiments, the information database 200 may provide recommended actions to perform for different problem classifiers 206 and supported architectures 208, such as recommend to join database instances, program fixes and configuration setting adjustments to correct errors/bottlenecks in the environment, license renewals that are needed for installed applications, contact a consultant, etc.

Figure 3:
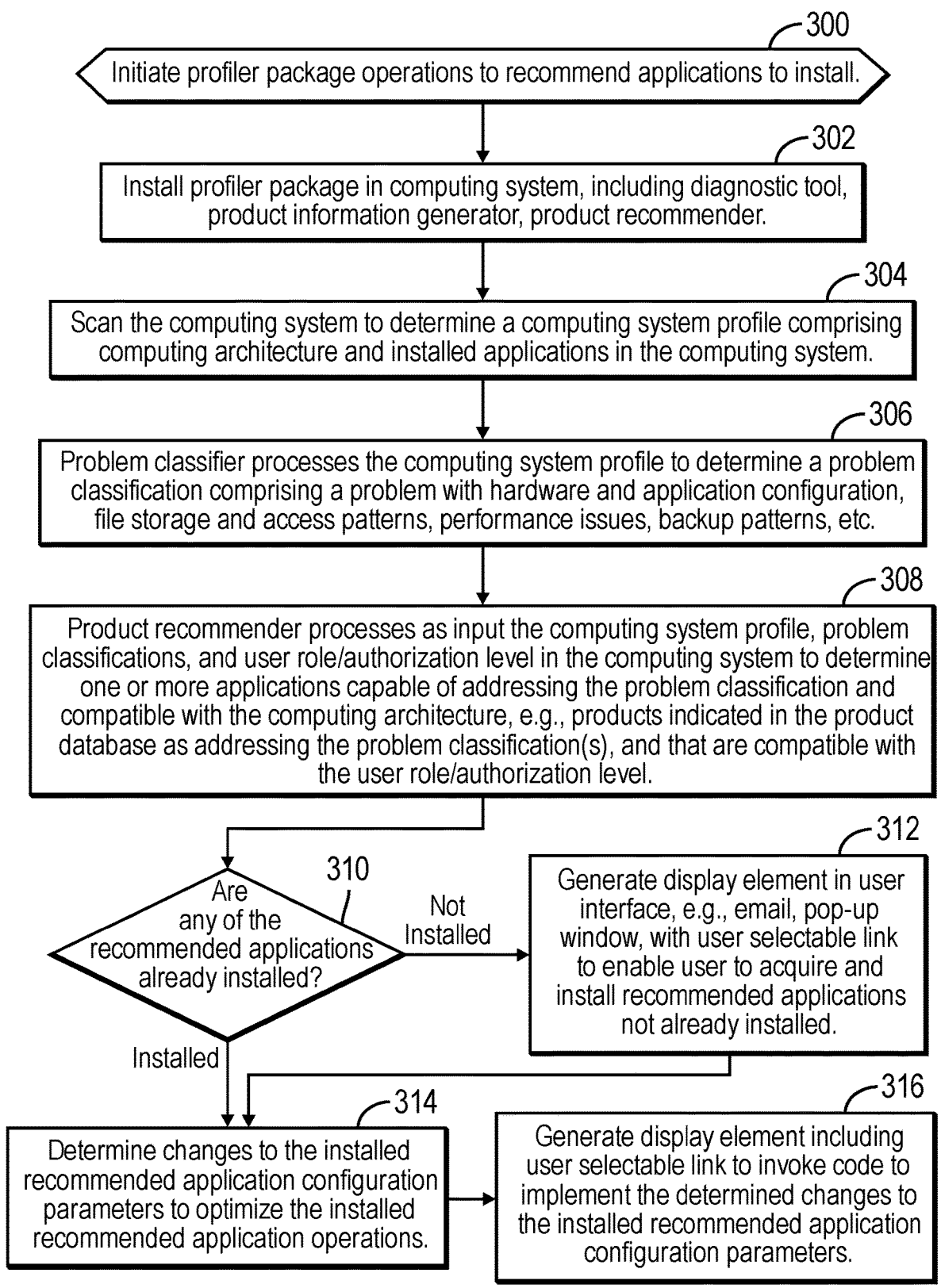
FIG. 3 illustrates an embodiment of operations to process a computing system to determine applications to recommend to install in the computing system to improve performance and operations.

FIG. 3 illustrates an embodiment of operations performed by the diagnostic tool 116, problem classifier 118, and product recommender 126 to recommend products for the computing system 100. Upon initiating (at block 300) profiler package 110 operations, the profiler package 110, which may have been recently downloaded from the profiler provider 112, is installed (at block 302) on the computing system 100, including diagnostic tool 116, product information generator 122, product recommender 126, and the product information 200. The diagnostic tool 116 scans (at block 304) the computing system 100 to determine a computing system profile 130, such as architecture (hardware and software), operating system, computing devices, servers and connectivity, file access patterns, file storage patterns, performance metrics (e.g., file access, network performance, database performance, backup performance, etc.). The problem classifier 118 processes (at block 306) the computing system profile to determine problem classification(s) 132 comprising a problem with hardware and application configuration, file storage and access patterns, performance issues, backup patterns, etc. The product recommender 126 processes (at block 308) as input the computing system profile 130, problem classifications 132, and a user role or authorization in the computing system 100 to determine one or more applications capable of addressing the problem classification 132, that are also compatible with the computing architecture, and that are consistent with the user role and authorization level in the computing system 100. The determined applications may comprise product information instances 200i for software products having problem classifiers 206 matching or related to the determined problem classifiers 132 and having supported architecture(s) 208 matching or related to the determined computing architecture in the computing system profile 130. Further, the recommended applications may be consistent with the user roles in the computing system 100 and comply with the user authorization level. For instance, if the recommended application will access sensitive information in the computing system, then the user downloading and installing the profiler package 110 will have to have a high authorization level.

If (at block 310) any of the recommended applications 200i are not installed, then the product recommender 126 generates (at block 312) a display element product recommendation 128 in a user interface, e.g., email, pop-up window, with user selectable links to enable the user of the computing system 100 to acquire and install recommended applications not already installed. The display element 128 may include hypertext links or code to access an external software product server 134 over the network 114 to acquire and download the recommended applications. If (at block 310) any of the recommended applications are already installed or after install any recommended applications not previously installed (at block 312), then the product recommender 126 or other component may determine (at block 314) changes to the installed recommended application configuration parameters to optimize the installed recommended application operations. The optimized configuration parameters may be indicated in optimal settings 212 for different computing architectures and computing system profiles 130, including architecture, usage and storage patterns, performance metrics, etc. The product recommender 126 may generate (at block 316) a display element, e.g., email, pop-up window, dialog box, etc., including a user selectable link to invoke code to implement the determined changes to the installed recommended application configuration parameters in the computing system 100.

In alternative embodiments, where the recommendation is not of an application to install, but instead a different type of recommended action, such as a recommendation to join database instances, program fixes and configuration setting adjustments to correct errors/bottlenecks in the computing system, license renewals that are needed for installed applications, contact a consultant, etc., then the operations of FIG. 3 may end at block 308 with recommendation of the alternative action.

Figure 4:
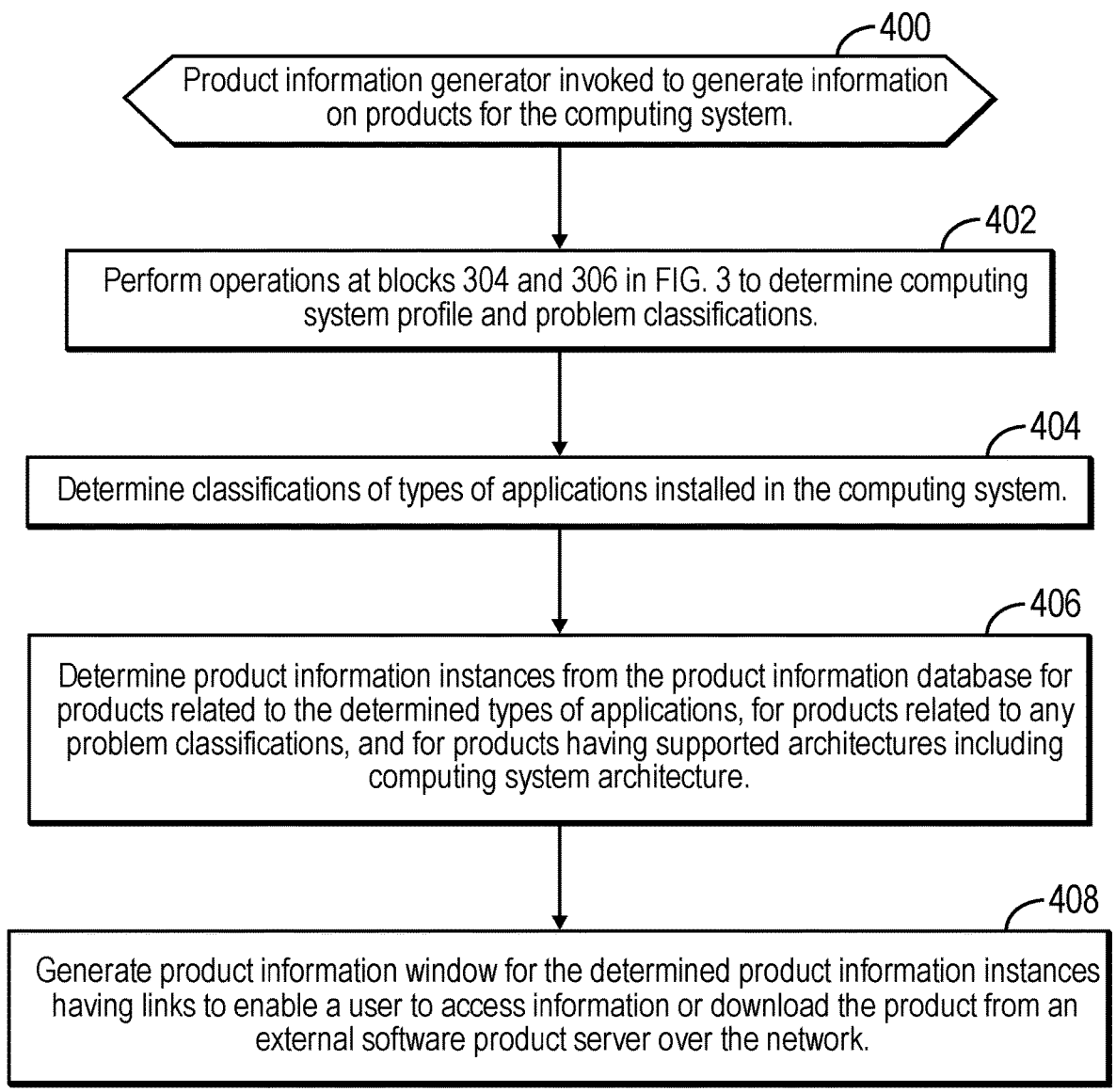
FIG. 4 illustrates an embodiment of operations to process a computing system to determine product information on software programs to present to a user of the computing system and to enable the user to access further information on the software products or purchase.

FIG. 4 illustrates an embodiment of operations performed by the product information generator 122 to generate information on products at the computing system 100, such as in the form of advertisements. Upon invoking (at block 400) the product information generator 122, the diagnostic tool 116 performs (at block 402) the operations at blocks 304 and 306 in FIG. 3 to determine computing system profile 130 and problem classifications 132. The diagnostic tool 116 may further determine (at block 404) classifications of types of applications installed in the computing system 100. The product information generator 122 may determine (at block 406) product information instances 200$i$ from the product information database 200 for products related to the determined types of applications and for products related to any problem classifications, such as product instances 200$i$ having a program type 210 matching or related to the determined classified types of applications, having program types 210 matching the types of applications 108 already installed in the computing system 100, because the user of the computing system 100 has an interest in programs of that type, and having supported architectures 208, e.g., operating system and hardware, compatible with the computing system architecture in the computing system profile 130. The product information generator 122 generates (at block 408) a product information window 124, e.g., pop-up window, email, etc., for the determined product information instances for the products related to types of applications having links to enable a user to access information or download the product from an external software product server 134 over the network 114.

With the embodiment of operations of FIGS. 3 and 4, all of the operations performed by the diagnostic tool 116, problem classifier 118, product recommender 126, and product information generator 122 may be performed within the computing environment of the computing system 100 without accessing an external network 114 to access an external system 112, 134 not part of the computing system environment. However, with the embodiment of operations of FIGS. 3 and 4, the diagnostic tool 116, problem classifier 118, product recommender 126, and product information generator 122 may not access external servers and computers not part of the computing system environment over a public network to transmit private and sensitive information as part of diagnosing the system and problems and recommending products. In this way, users can be assured they are not sharing any sensitive or proprietary information with third parties.

In the embodiments when generating the product information window 124 and product information graphical element 128 comprises generating an email, the product information generator 122 and product recommender 126 may call the computing system 100 email server to send an email to a user at the computing system 100 without going outside of the computing system environment to an external, third party server. This ensures that all gathered information and generated product information and recommendations remain internal to the computing system environment, unless a user of the computing system 100 takes intentional action to access a recommended program or product information from third party server 134 over a public network 114.

In an alternative embodiment, the diagnostic tool 116, problem classifier 118, product recommender 126, and product information generator 122 may access an external third party server 134 for information upon approval from the operator of the computing system 100 of the information being sent.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or in case of disconnected networks (air-gapped) copied manually. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
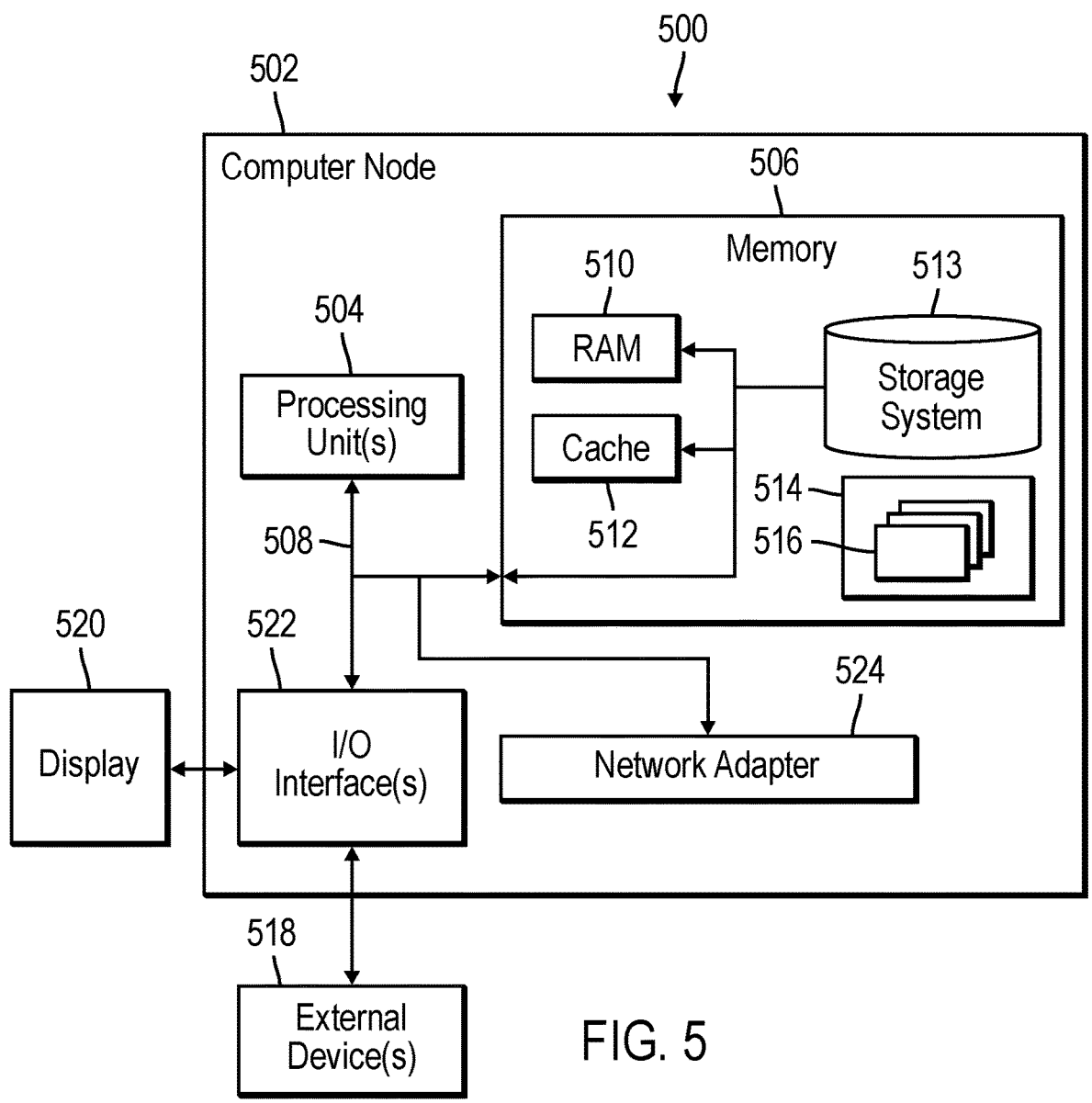
FIG. 5 depicts a computing environment in which the components of FIG. 1 may be implemented.

The computational components of FIG. 1, including the computing system 100, profiler provider 112, and software product server 134 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed:

1. A computer program product for providing application recommendations to a computing system accessible over a network, wherein the computer program product comprises a computer readable storage medium having computer readable program instructions executed to perform operations, the operations comprising:
   transmitting a package to the computing system including package code to execute in the computing system to perform operations comprising:
   scanning the computing system to determine a computing system profile comprising a computing architecture and installed applications at the computing system;
   processing the computing system profile to determine a recommended action to perform with respect to the computing system to improve operations of the computing system based on the computing system profile; and
   generating a display element in a user interface with information on the recommended action to enable a user of the computing system to implement the recommended action, wherein the package code executes within the computing system without communicating over the network to an external system outside of a computing environment of the computing system when performing the scanning, the processing the computing system profile to determine the recommended action, and the generating the display element with information on the recommended action.

2. The computer program product of claim 1, wherein the recommended action comprises a recommendation of at least one of to join database instances, an application to install, program fixes and configuration setting adjustments to correct errors/bottlenecks in the computing system, license renewals that are needed for installed applications, and contact a consultant to troubleshoot the computing system.

3. The computer program product of claim 1, wherein the generating the display element comprises:
calling an email program running in the computing system to create an email message, comprising the display element, wherein the information on the recommended action in the email message includes a user selectable link to invoke the recommended action from the external system over the network.

4. The computer program product of claim 1, wherein the processing the computing system profile to determine the recommended action further comprises:
diagnosing at least one of the computing architecture, file access patterns, file storage patterns, and performance metrics at the computing system to determine a problem classification comprising a problem effecting performance of the computing architecture; and
determining an action indicated as addressing the problem classification and compatible with the installed applications and the computing architecture, wherein the recommended action comprises the determined action addressing the problem classification.

5. The computer program product of claim 1, wherein the operations further comprise, without communicating over the network to an external system outside of the computing environment of the computing system:
determining a role and authorization level of the user invoking the package code;
determining a plurality of actions to improve operations of the computing system based on the computing system profile; and
determining at least one of the actions the user is authorized to initiate in the computing system, wherein the information on the recommended action includes the determined at least one of the actions the user is authorized to initiate in the computing system.

6. The compute program product of claim 1, wherein the package includes product information on applications, wherein the operations further comprise:
processing the computing system profile to determine classifications of types of applications installed in the computing system;
determining a product information instance from the product information for a product related to the determined classifications of types of applications; and
generating an interface window including the determined product information instance and a user selectable link to access further information on the product related to the determined classifications of types of applications from at least one external server over the network outside of the computing environment of the computing system.

7. The computer program product of claim 1, wherein the computing system comprises a distributed computing environment including a plurality of computing devices and a web server, wherein the user of the computing system accesses the web server to invoke the package code to communicate with the computing devices in the distributed computing environment to determine the computing system profile.

8. The computer program product of claim 1, wherein the recommended action comprises a recommended application to install on the computing system, wherein the display element to enable the user to implement the recommended action comprises enabling the user of the computing system to acquire and install the recommend application by downloading the recommended application from over the network.

9. The computer program product of claim 8, wherein the operations further comprise, without communicating over the network to an external system outside of the computing environment of the computing system:
determining whether the recommended application is installed in the computing system;
determining configuration settings that effect operations of the recommended application in response to determining that the recommended application is installed in the computing system; and
determining changes to the configuration settings to optimize operations of the installed recommended application, wherein the information on the recommended application includes a user selectable link to code to implement the determined changes to the configuration settings in the computing system.

10. A system for providing application recommendations to a computing system accessible over a network, comprising:
a processor; and
a computer readable storage medium having computer readable program instructions that when executed by the processor performs operations comprising:
transmitting a package to the computing system including package code to execute in the computing system to perform operations, the operations comprising:
scanning the computing system to determine a computing system profile comprising a computing architecture and installed applications at the computing system;
processing the computing system profile to determine a recommended action to perform with respect to the computing system to improve operations of the computing system based on the computing system profile; and
generating a display element in a user interface with information on the recommended action to enable a user of the computing system to implement the recommended action, wherein the package code executes within the computing system without communicating over the network to an external system outside of a computing environment of the computing system when performing the scanning, the processing the computing system profile to determine the recommended action, and the generating the display element with information on the recommended action.

11. The system of claim 10, wherein the recommended action comprises a recommendation of at least one of to join database instances, an application to install, program fixes and configuration setting adjustments to correct errors/bottlenecks in the computing system, license renewals that are needed for installed applications, and contact a consultant to troubleshoot the computing system.

12. The system of claim 10, wherein the processing the computing system profile to determine the recommended action further comprises:
- diagnosing at least one of the computing architecture, file access patterns, file storage patterns, and performance metrics at the computing system to determine a problem classification comprising a problem effecting performance of the computing architecture; and
- determining an action indicated as addressing the problem classification and compatible with the installed applications and the computing architecture, wherein the recommended action comprises the determined action addressing the problem classification.

13. The system of claim 10, wherein the package includes product information on applications, wherein the operations further comprise:
- processing the computing system profile to determine classifications of types of applications installed in the computing system;
- determining a product information instance from the product information for a product related to the determined classifications of types of applications; and
- generating an interface window including the determined product information instance and a user selectable link to access further information on the product related to the determined classifications of types of applications from at least one external server over the network outside of the computing environment of the computing system.

14. The system of claim 10, wherein the recommended action comprises a recommended application to install on the computing system, wherein the display element to enable the user to implement the recommended action comprises enabling the user of the computing system to acquire and install the recommend application by downloading the recommended application from over the network.

15. The system of claim 14, wherein the operations further comprise, without communicating over the network to an external system outside of the computing environment of the computing system:
- determining whether the recommended application is installed in the computing system;
- determining configuration settings that effect operations of the recommended application in response to determining that the recommended application is installed in the computing system; and
- determining changes to the configuration settings to optimize operations of the installed recommended application, wherein the information on the recommended application includes a user selectable link to code to implement the determined changes to the configuration settings in the computing system.

16. A method for providing application recommendations to a computing system accessible over a network, comprising:
- transmitting a package to the computing system including package code to execute in the computing system to perform operations comprising:
  - scanning the computing system to determine a computing system profile comprising a computing architecture and installed applications at the computing system;
  - processing the computing system profile to determine a recommended action to perform with respect to the computing system to improve operations of the computing system based on the computing system profile; and
  - generating a display element in a user interface with information on the recommended action to enable a user of the computing system to implement the recommended action, wherein the package code executes within the computing system without communicating over the network to an external system outside of a computing environment of the computing system when performing the scanning, the processing the computing system profile to determine the recommended action, and the generating the display element with information on the recommended action.

17. The method of claim 16, wherein the recommended action comprises a recommendation of at least one of to join database instances, an application to install, program fixes and configuration setting adjustments to correct errors/bottlenecks in the computing system, license renewals that are needed for installed applications, and contact a consultant to troubleshoot the computing system.

18. The method of claim 16, wherein the processing the computing system profile to determine the recommended action further comprises:
- diagnosing at least one of the computing architecture, file access patterns, file storage patterns, and performance metrics at the computing system to determine a problem classification comprising a problem effecting performance of the computing architecture; and
- determining an action indicated as addressing the problem classification and compatible with the installed applications and the computing architecture, wherein the recommended action comprises the determined action addressing the problem classification.

19. The method of claim 16, wherein the package includes product information on applications, further comprising:
- processing the computing system profile to determine classifications of types of applications installed in the computing system;
- determining a product information instance from the product information for a product related to the determined classifications of types of applications; and
- generating an interface window including the determined product information instance and a user selectable link to access further information on the product related to the determined classifications of types of applications from at least one external server over the network outside of the computing environment of the computing system.

20. The method of claim 16, wherein the recommended action comprises a recommended application to install on the computing system, wherein the display element to enable the user to implement the recommended action comprises enabling the user of the computing system to acquire and install the recommend application by downloading the recommended application from over the network.

* * * * *